Figure 1:
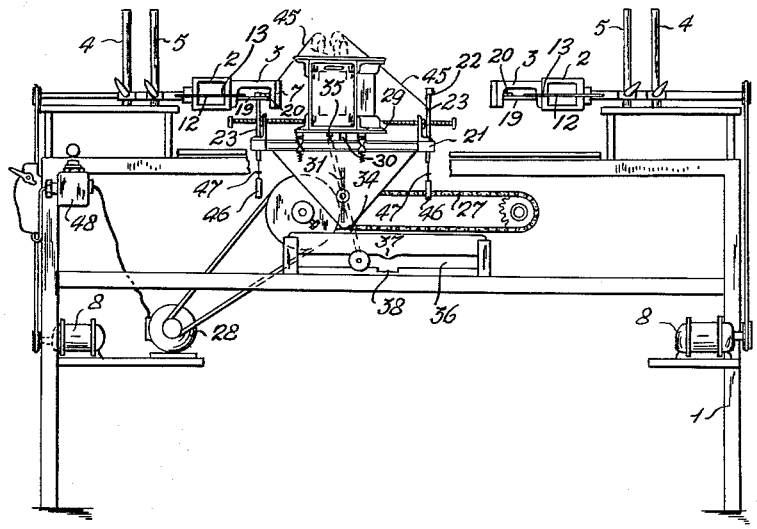

March 27, 1962 K. H. N. SCHULPEN 3,026,753
APPARATUS FOR CUTTING TAPERED SHOULDER PADS
SUCCESSIVELY AND WITHOUT WASTE MATERIAL
Filed Aug. 26, 1955 4 Sheets-Sheet 1

INVENTOR
KAREL H.N. SCHULPEN

BY Stevens, Davis, Miller and Mosher

ATTORNEYS

INVENTOR
KAREL H. N. SCHULPEN

BY Stevens, Davis, Miller and Mosher

ATTORNEYS

March 27, 1962 K. H. N. SCHULPEN 3,026,753
APPARATUS FOR CUTTING TAPERED SHOULDER PADS
SUCCESSIVELY AND WITHOUT WASTE MATERIAL
Filed Aug. 26, 1955 4 Sheets-Sheet 4
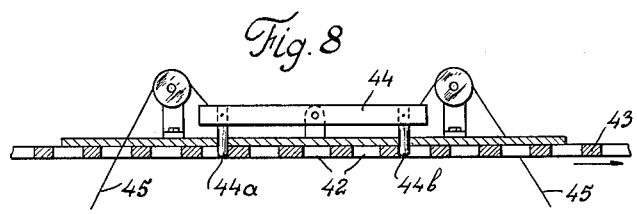
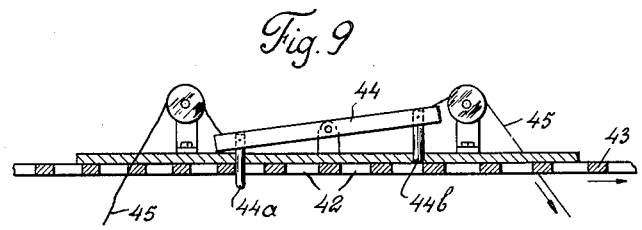
INVENTOR.
Karel H. N. Schulpen
BY
Stevens, Davis, Miller & Mosher
ATTORNEYS United States Patent Office 3,026,753
Patented Mar. 27, 1962

3,026,753
APPARATUS FOR CUTTING TAPERED SHOULDER PADS SUCCESSIVELY AND WITHOUT WASTE MATERIAL
Karel H. N. Schulpen, Haviklaan Nr. 17, The Hague, Netherlands
Filed Aug. 26, 1955, Ser. No. 530,737
Claims priority, application Netherlands Aug. 26, 1954
5 Claims. (Cl. 83—154)

This invention relates to an apparatus for cutting objects from material, particularly for cutting shoulder pads from bar- or block-shaped material and aims at providing an apparatus of simple design and permitting of quick operation.

For this purpose the apparatus according to the invention is characterized in that it comprises at least one driven band- or strip-shaped cutting means running over a shaping member which is stationary in relation to said cutting means and projects beyond said shaping member. The shaping member with the cutting means may be moved in relation to the material or vice versa. Due to the fact that the shaping member is stationary in relation to the cutting means, the former may have the shape of part of a cylindrical surface as well as a curved shape differing therefrom so that the cutting means running over the said shaping member is forced to cut objects from the material which are adapted to the shape of this shaping member. This is, for instance, of special importance for shoulder pads, as in this manner these may be given an asymmetric form. Due to the fact that the cutting means runs over the shaping member the former may be easily replaced by a new cutting means when blunt.

As the cutting means must run over the edge of the shaping member, there is the risk that it shifts slightly inwards or outwards or that it runs entirely off the shaping member. In order to avoid this and yet to keep the cutting means sufficiently flexible so that it can follow the shape of the shaping member well, the cutting means may, according to the invention, be provided with projections by means of which it moves in a groove of the shaping member. This groove is preferably so much narrower than the width of the cutting means that the latter is guided on both sides of the groove over at least one millimeter.

According to the invention the cutting means may be secured to a narrower strip of material serving as a guiding means for the cutting means. This material should be so flexible that the cutting means thereby does not become inadmissably rigid.

In order to reduce the wear of the cutting means sliding over the shaping member which is stationary in relation thereto, the apparatus according to the invention may be equipped with means which stop the driving mechanism of the cutting means every time after the termination of the cutting operation and start the driving means again before the next cutting operation commences.

In particular when cutting shoulder pads from elastic material, for example, from multi-cellular foamed matter (polyurethane polyester diisocyanate) the possibility exists that the separated object springs back or sinks down somewhat so that it comes into contact with the material from which it has been cut. When the material moves in relation to the separated object there is the risk that this separated object is taken along and consequently does not drop out of the apparatus. In order to avoid this, a gripping device may be provided, according to the invention, in the shaping member, said gripping device gripping the separated object and moving it slightly backwards in relation to the shaping member, whereupon this gripping device releases the separated object which then may be discharged from the apparatus.

According to the invention the gripping device may consist of a curved rod rotatably mounted on a second rotatable spring-biased rod which is controlled by a cam in such a manner that the spring is moved every time through its middle position.

According to the invention the gripping device may be adjustable by the adjustment of its fulcrum and/or the adjustment of its spring and/or the adjustment of a transverse member arranged on the legs of a fork secured to the gripping device.

The invention will be described below with reference to the annexed drawings showing by way of example an embodiment of the apparatus according to the invention.

Figure 2:
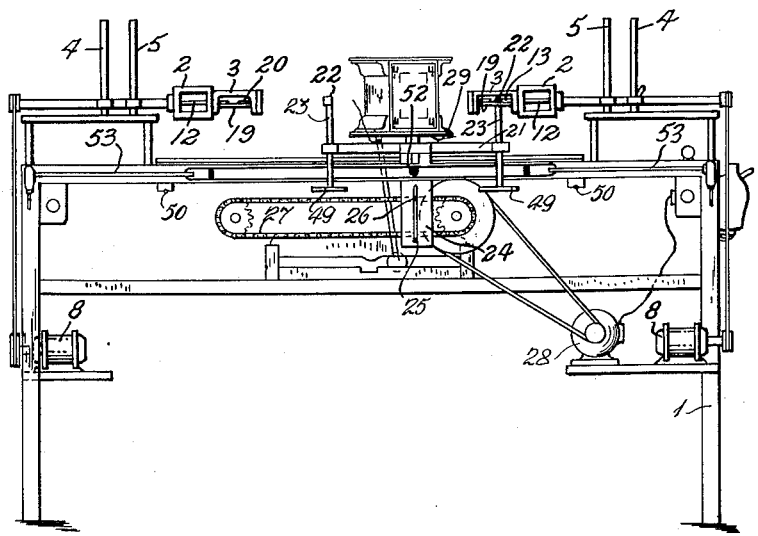
Figure 3:
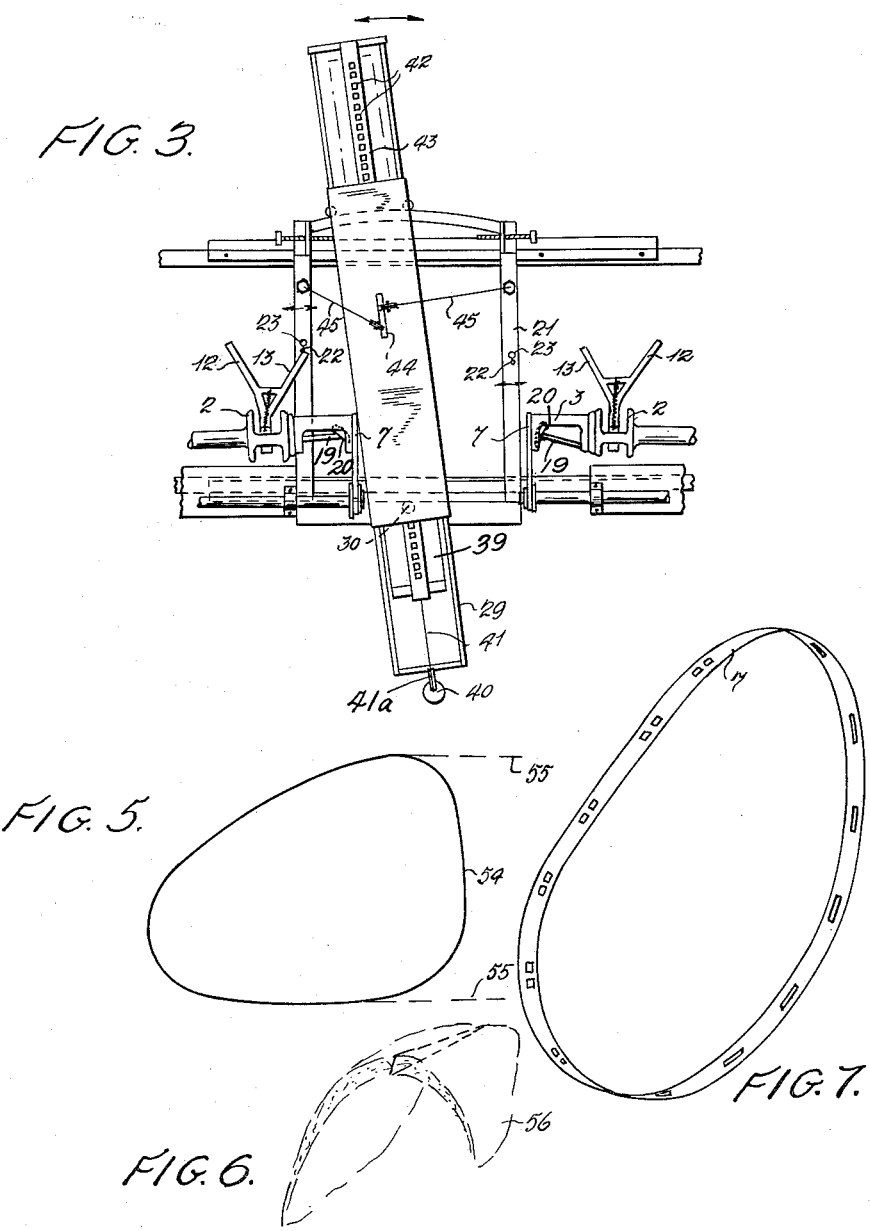
Figure 4:
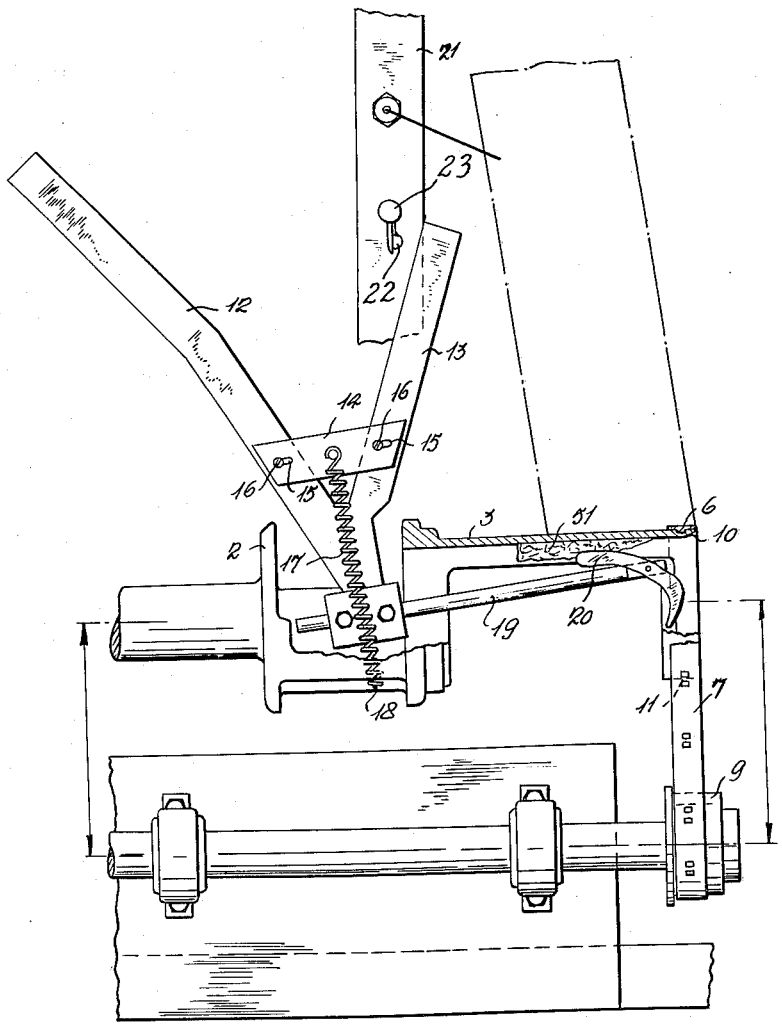

FIG. 1 shows a rear view of the said apparatus.
FIG. 2 shows a front view of this apparatus, in which some parts of the apparatus have been left out for the sake of clarity.
FIG. 3 is a top plan view of part of the apparatus.
FIG. 4 shows, on an enlarged scale, part of this apparatus partly in section and partly in view.
FIG. 5 shows diagrammatically a section through another shaping device.
FIG. 6 shows an asymmetric shoulder pad.
FIG. 7 shows a band-shaped cutting means in perspective.
FIGURES 8 and 9 are detailed elevational views of the carriage control means.

The apparatus shown in the drawings comprises a frame 1 in which two shaping members 2 are fixedly arranged. Each shaping member 2 has a cylindrical sleeve 3 of which the curved surface has been partly broken away or is provided with one or more recesses and may be fixed on two rods 4 and 5 by means of a portion having perforations. If required, several shaping members may be arranged on these rods 4, 5 one above the other so that every time two or more shoulder pads may be simultaneously cut from a block or bar consisting of elastic multicellular foamed material. These shaping members are exchangeably arranged on the rods so that it is possible to cut shoulder pads of any desired shape and of any desired size.

As is apparent in particular from FIG. 4 the edge of each shaping member is at its end conically tapered so that a more or less sharp edge 6 is formed. A flexible band- or strip-shaped cutting knife 7 runs over the end of each shaping member, said knife also running over a roller or disc 9 provided with rubber or a similar material having a high coefficient of friction and being driven by a motor 8. The cutting knife 7 of which the edge may, if desired, have the form of a saw, therefore slides over the end of each shaping member and projects slightly beyond the edge 6. In order to prevent the cutting knife from running off the end of a shaping member a groove 10 is provided in this end in which projections 11 of the cutting knife 7 move. These projections may, for example, consist of short metal strips inserted in slots of the cutting knife 7 and thereafter bent. In a similar way also a strip of material of less width but of the same length may be secured to the cutting knife. However, care should be taken that the cutting knife remains sufficiently flexible so that it fits well to the shaping member.

In each shaping member 2 a fork 12, 13 is rotatably arranged, the leg 12 of this member being longer than the leg 13. Between the fork legs 12 and 13 there is a transverse member 14 adjustably secured to these fork legs by means of bolts 16 passing through slots 15. This transverse member is connected to one end of a spring 17 which is secured with its other end in 18 to the shaping member 2. A rod 19 is secured to the fork 12, 13, said rod carrying at its end a spring-biased curved rod 20 rotatably secured to the rod 19. The fork 12, 13, the rod 19 and the rotatable curved rod 20 constitute together a gripping device for the separated objects. Its operation will be more particularly described hereafter, but, in general, the operation is as follows. The curved rod 20 is rotatably supported by the rod 19. The rod 19 is secured to the fork 12, 13 which is supported by the shaping member 2 by means of a pin (not shown) so that it can swing. The carriage 21 is moved until the leg 13 of the fork 12, 13 comes into contact with a rotatable rod 22 which is blocked, so that it moves the fork. When said fork is moved, the rod 20 comes into contact with the object 51 that has been cut from the block by the cutting knife 7. The rod 22 is provided with a hole in which the upper part of the rod 23 is inserted. It is also evident that it is possible to provide the rod 22 with an eye which grips around the upper part of the rod 23 and which rests on a soulder of the rod. The axis of rotation of the rod is the axis of the rod 23. As can be appreciated, the rod 22 must indeed be somewhat longer than the rod 23. When the fork 12, 13 is returned into its original position by means of the rod 22 which comes into contact with its leg 12, the rod 19 is turned also into its original position. As the rod 20 is spring biased, it returns to its original position in consequence of which it releases the object 51 so that it may drop out of the shaping member.

In FIGURE 4, the carriage is shown in position during its movement to the right. In its outer left position it has pushed the leg 12 into the position as shown. When the carriage 21 is moved to the right, the rod 22 is pushed against the abutment on the rod 23 so that the rod 22 is pushed against the member 13 and the fork 12, 13 is shifted. Since the rod 19 is secured to the fork 12, 13, the rod 19 is rotated over the same angle as the fork so that it assumes a downwardly inclined position. The fork 12, 13, and rods 19 and 20 will then be back in their original position.

Each fork 12, 13 is controlled by a rod 22 secured to a carriage 21 adapted to reciprocate, said rod 22 being rotatably secured to a rod 23 in such a manner that the said rod 22 can only rotate in one direction and is blocked in the other direction by a stop provided on the rod 23.

The carriage 21 is provided with a downwardly projecting portion 24, shown in FIG. 2, which may be secured, if desired in a pivotal way, to the carriage and in which a slot 25 is provided. A pin 26 fits in this slot, said pin being secured to an endless chain 27 running over sprocket wheels. One of these sprocket wheels is driven by a motor 28 mounted in the frame 1. In order to reduce the friction a bearing may be mounted on the pin 26.

In the carriage 21 a frame 29 is rotatably mounted on a shaft 30. The shaft 30 is mounted in the carriage 21, as shown in FIGURE 3. The rear side of the carriage 21 has a downwardly projecting plate 32 provided with a slot 31 in which a pin 33 has been arranged in such a manner that it may be fixed and adjusted. This pin 33 is secured to a lever 34 connected to the frame 29 by means of a ball and socket joint 35. The other end of this lever which end of the lever is bent, moves in a slot 36 provided in the frame 1, said slot 36 having a raised portion 37 and a recess 38 which causes the frame 29 on the carriage 21 to oscillate so that this frame forms an angle with the cutting plane of the cutting knife 7. Pin 33, shown in FIG. 1, is secured to the lever 34 so that the lever arms may be adjusted in consequence of which the stroke of the frame 29 will be changed. When the carriage moves, the end of the lever 34 will enter the recess 38. On further movement of the carriage 21, the lever 34 will assume a vertical position and finally a position inclining from the left to the right instead of from the right to the left as shown in FIG. 1. Accordingly the frame will rotate around its shaft 30.

The cutting plane of the knife 7 is positioned vertically to the plane of FIG. 1 and the frame 29 obliquely to the plane of FIG. 1 whereby an angle is formed therebetween.

The frame 29 has two end positions. In FIGURE 3, one of such end positions is shown, in which the left knife is cutting. The other end position is symmetrical to a vertical line in the plane of the drawing through 30. In such other position, the right hand knife is cutting.

In the frame 29 a second carriage 39 is slidably arranged, in which second carriage a bar-shaped block of multicellular artificial material can be arranged. A weight 40 is attached to this second carriage by means of a cable 41 running over a disc 41a, said weight urging the carriage to move. The displacement of the carriage 39 is regulated by a plate 43 having recesses 42 and being secured to the carriage 39. A lever 44 is provided and has two pins 44a and 44b and which cooperate with these recesses. These pins are arranged in such a way that always at least one pin is in a recess 42. In FIGURE 8, one pin 44b is positioned against the front and the other pin 44a against the back of a dam. Consequently, the carriage may move as soon as the pin 44b, positioned against the front of the dam, is lifted from its recess. As soon as the second pin 44a contacts the front of the next dam, the carriage stops (FIGURE 9). Lifting the pins from the recesses is carried out by means of cables 45 of which one end is connected to one of the lever arms, the other end being loaded with a weight 46. The oscillation to and fro of the frame 29 tensions one of the two cables whereas the other cable slackens in that each of these cables has a thickened portion 47 co-operating with a tubular abutment through which the cable in question passes. Every time when a cable is stretched taut, the corresponding lever arm is raised so that the pin secured thereto is lifted from its recess.

The above-described apparatus functions as follows:

When the second carriage 39 is provided with a bar-shaped block of multicellular artificial material, the motor 28 is started by means of the main switch 48. Consequently the carriage 21 is moved to and fro via the pin 26 arranged on the chain so that the motor 28 is allowed to rotate in the same direction. Since the pin 26 is secured to an endless chain and movable in the slot 25, the motor 28 may always rotate in the same direction. When the part of said endless chain moves over the left hand sprocket, the pin 26 will move downward to the slot 25. As soon as such part has left the sprocket, the pin 26 will take the carriage 21 to the right until it reaches the right hand sprocket. It then will move upwards in slot 25 and thereafter move the carriage to the left. In the above-described manner the frame 29 is rotated forwards and backwards when the carriage 21 is moved to and fro. After the frame 29 has been rotated to its left hand position on the carriage 21 an adjustable abutment 49 arranged on the carriage 21 comes into contact with a contact 50 so that consequently the left hand motor 8 is switched on. This motor drives its cutting knife 7 through the above-described driving mechanism so that this knife cuts from the block of material a portion which tapers in its longitudinal section and has at its outer side a surface corresponding with part of a cylinder surface. As may be seen from FIG. 3 of the drawings the longitudinal axis of the block of material makes an angle with the vertical plane through the shaft 30. When the block of material is moved by the carriage 21 towards the knife 7, a tapered portion will be cut from said block. If the shaping means of the knife is cylindrical, a cylindrical shell-like portion will be cut from the block which tapers from one side to the other. When using a shaping means, according to FIG. 5, a shell-like portion shown in FIG. 6 will be obtained. After having cut a portion from the left to the right, a portion is cut from the right to the left by the other knife 7. Before cutting the second portion, however, the second carriage 39 is brought into its other end position at the furthest extent of its oscillatory motion. As soon as the rod 22 contacts the fork leg 12 the portion 51 being cut from the block of material is caught by the end of the curved rod 20 and is pushed slightly away from the block of material in that the fork 12, 13 is suddenly reversed by the action of its spring 17. As previously described each fork 12, 13 is controlled by a rod 22 secured to the carriage 21. Said rod 22 is rotatably secured to a rod 23 in such a way that it can only rotate in one direction and is blocked in the other direction. The fork 12, 13 is moved, when the carriage 21 is moved in FIG. 4 from the left to the right since in that case the rod 22 is blocked. As soon as the spring 17, fixed to said fork, is moved past its middle or "dead" position it suddenly moves the fork.

When the portion 51 has been cut off, the carriage 21 has moved so far that the abutment 52 fixed to it comes into contact with the rod 53 which controls the motor 8 (e.g. by opening a switch) which causes the left hand motor 8 to stop so that consequently the cutting knife 7 is no longer driven and may cool down. Moreover, this considerably reduces the wear of the cutting knives.

The motor 8 is arranged for driving the knives 7 so that it does not interfere with the movement of the carriage 21 which is moved by the motor 28, pin 26 and chain 27. The apparatus is constructed so that the carriage is moved back when an object has been severed from the block of material. When the carriage 21, of which the direction of movement has meanwhile been reversed, is moved further, the fork leg 13 comes into contact with the rod 22 which now cannot rotate anymore in relation to the rod 23 but is situated against the abutment arranged on this rod. Consequently the fork 12, 13 is shifted again and is moved by its spring 17 into its other final position. Due to the shifting of the fork 12, 13 the rod is rotated so that the curved rod 20 releases the portion 51 which thereafter may drop out of the shaping member.

As may be seen from FIG. 3 the carriage 21 has not reached its second end position when the left fork 12, 13 has been moved so that said carriage 21 still moves further. When moving further the second carriage 39 will rotate from the left to the right on said carriage 21. In consequence thereof, the carriage 39 will pull the cable 45 until the thickened portion 47 of this cable reaches the tubular abutment through which the cable 45 passes. When the second carriage 39 rotates further, the cable 45 will move the lever 44 so that its pin, which is in contact with the rear side of the strip of material between the openings 42, is lifted out of said opening. The weight 40 will move the carriage 39 in the frame 29 until the other pin of the lever 44 lies against the rear side of the strip of material. The first pin of the lever 44 is then above the opening 42 next to the opening which it has left. When the carriage 21 is moved further on, the right hand motor 8 is switched on so that the right hand cutting member is driven and all further movements described above are carried out.

The motor 8 is switched on again by the abutment 49 which comes into contact with the switch 50. It is switched out by the abutment 52 as soon as it reaches the rod 53. This applies for the movement from the left to the right as well as for the movement from the right to the left (see FIG. 2 in which two switches 50 and two rods 53 are shown).

It is clear that the invention is not restricted to the embodiment described above and shown by way of example in the drawings. Instead of the above-described fully automatic apparatus one could, for example, also use a semi-automatic apparatus in which the carriages are moved by hand. Also the shaping members may be moved in relation to the block of material etc. whilst it is also possible to move the shaping member with the driven cutting means by hand and to construct it as a separate unit.

The shape of the separated object depends on the shape of the portion of the shaping member with which the cutting means is in contact. By giving this shaping member the shape 54 in FIG. 5 an asymmetric object is cut for instance which is particularly preferred for shoulder pads. The knife running over this shaping member is designated by 55. FIG. 6 shows a shoulder pad 56 cut with such an asymmetric shaping member. If a cutting means is used which is not endless, said means should carry out a quick reciprocating movement.

I claim:

1. An apparatus for the manufacture of curved objects out of a block of multicellular material; comprising a first frame, at least one stationary curved shaping means mounted on said first frame and having a shape corresponding to the shape of the objects to be cut from the block, a driven flexible cutting band slidably mounted on and guided by said shaping means and having a cutting edge projecting beyond the shaping means, a first carriage mounted on the first frame for movement to and fro in said frame, a second frame swingably mounted on said carriage and a second carriage adapted to carry a block of material said second carriage being slidably arranged on said second frame, and driving means for moving said first and second carriage and said second frame.

2. An apparatus according to claim 1, characterized in that the driving means for moving the second carriage on the second frame consists of a lever pivotally mounted on said second frame intermediate its ends, said lever being provided with a pin at each of its ends, said pins cooperating with recesses in the second carriage, a cable fixed to each end of said lever, weight means attached to the cable for moving the pins out of or into said recesses in such a way that said second carriage is moved step-wise in the second frame.

3. An apparatus according to claim 1, characterized in that the means for moving the second carriage is arranged to move the carriage step-wise in the second frame, and a gripping means mounted in the shaping means for gripping the objects as they are severed from the block of material and moving the severed objects back away from the cutting edge and then releasing such objects for discharge from the apparatus.

4. An apparatus according to claim 1, characterized in that the means for moving the second carriage is arranged to move the carriage step-wise in the second frame, a gripping means mounted in the shaping means for gripping the objects as they are severed from the block of material and for moving the severed objects back away from the cutting edge and then releasing such objects for discharge from the apparatus, said gripping means consisting of a curved rod, a second swingable spring-biased rod on which the curved rod is rotatably mounted, said spring-biased rod being fixed to a swingable fork member driven by a projection on the first carriage.

5. An apparatus for the manufacture of curved objects out of a block of multicellular material, comprising a frame, a pair of stationary curved shaping means mounted on said frame in a longitudinally spaced arrangement, each of said shaping means having a shape corresponding to the shape of the objects to be cut from the block, a driven flexible cutting band slidably mounted on and guided by each of said shaping means and having a cutting edge projecting beyond the shaping means, carriage means slidably mounted on said frame for reciprocal longitudinal motion between said pair of shaping means, material carrying means pivotally mounted on said carriage means for adjustably supporting the block of material thereon, lever means coupling said material carrying means and said frame for oscillation of the material carrying means with respect to said longitudinally reciprocating carriage means, so that the block of material follows an arcuate path between said pair of stationary curved shaping means to present the respective face of the block to the cutting edge of each of said shaping means at the angle of the arcuate path to give the manufactured objects a wedge-shaped cross-section.

(References on following page)

References Cited in the file of this patent

UNITED STATES PATENTS

| | | |
|---|---|---|
| 350,726 | Drown | Oct. 12, 1886 |
| 933,904 | Huse | Sept. 14, 1909 |
| 1,088,573 | Heldman | Feb. 24, 1914 |
| 1,619,305 | Norris | Mar. 1, 1927 |
| 1,834,139 | Brostrom | Dec. 1, 1931 |
| 2,390,340 | Webb | Dec. 4, 1945 |
| 2,476,292 | Guay | July 19, 1949 |
| 2,489,153 | Rahe | Nov. 22, 1949 |
| 2,523,231 | Pianta et al. | Sept. 19, 1950 |
| 2,670,768 | Yohn | Mar. 2, 1954 |

FOREIGN PATENTS

| | | |
|---|---|---|
| 116,338 | Switzerland | Sept. 1, 1926 |
| 83,135 | Norway | Feb. 15, 1954 |